March 1, 1955 J. L. EDELEN 2,703,249
BAIL TYPE CLOSURE FASTENER
Filed Jan. 15, 1951

*INVENTOR.*
JAMES L. EDELEN
BY
ATTORNEY

United States Patent Office 2,703,249
Patented Mar. 1, 1955

2,703,249

BAIL TYPE CLOSURE FASTENER

James L. Edelen, Kirkwood, Mo., assignor to Carter Carburetor Corporation, St. Louis, Mo., a corporation of Delaware Application January 15, 1951, Serial No. 206,095

1 Claim. (Cl. 292—259)

This invention relates to detachable securing means for abutting members, particularly of the bail type as used to secure together a body of a fuel filter, fuel pump, or the like, and a settling bowl which must be removed from time to time for cleaning or inspection or replacement of underlying parts.

Such bails, customarily, have been formed, simply, of a U-shaped wire having inwardly bent ends forming hooks or trunnions which are swivelly mounted within cylindrical or semicylindrical pockets at the sides of the body member. Bails of this type present manufacturing difficulties in that during plating or coating, for instance, the inwardly bent ends tend to become hooked together in a complicated, tenacious mass of the parts. Furthermore, the extra bending operation necessary to form these inward trunnions, naturally, results in extra expense. Moreover, these bails have an annoying tendency to slip out of their trunnion supports when tilted to their non-securing positions.

Consequently, it is the object of the present invention to provide a novel, pivotal bail support which is simpler and less expensive to manufacture than the wire type bails mentioned and which is locked in position, particularly, when tilted to its non-securing position.

This object and other more detailed objects hereafter appearing are attained by the structure illustrated in the accompanying drawing in which.

Figure 1:
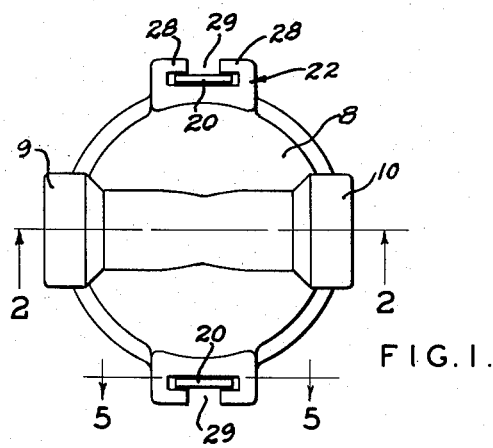
Fig. 1 is a top view of an internal combustion engine fuel filter embodying the invention.
Figure 2:
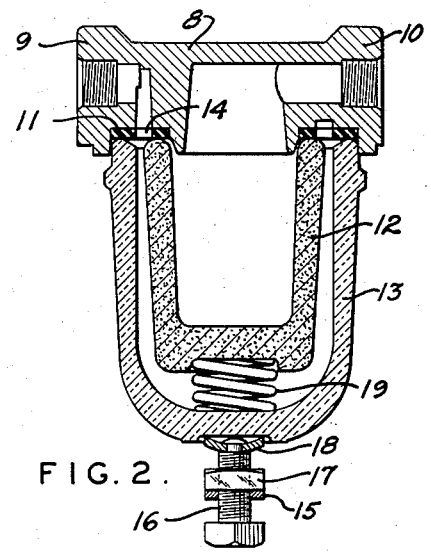
Fig. 2 is a vertical, transverse section taken on line 2—2 of Fig. 1.

The fuel filter shown has a main body portion 8 formed with internally threaded bosses 9 and 10 for connection into a fuel line, the intended path of the fuel being from fitting 9 to fitting 10. An annular recess on the under surface of the body receives a gasket 11 against which bears the upper edges of a filtering cup 12 and a glass settling bowl 13. Gasket 11 is perforated, as at 14, to permit the passage of fuel therethrough. The glass bowl is secured in position by a bail, generally indicated at 15, which, at its central, lower portion, threadedly receives a screw 16. The screw carries a lock nut 17 on the inside of the bail and a resilient cup 18 which bears against an abutment on the undersurface of the glass bowl. As is well known, tightening of screw 16 secures the bowl in position, while loosening of the screw permits swivelling of the bail and removal of the bowl. A coiled spring 19, secured between the filter element and bowl, secures the filter element in its normal, operative position.

The bail is formed of a sheet metal stamping and at each end has a cross head 20 forming shoulders 21 projecting normally to the general plane of the bail. No inwardly projecting finger or trunnion is provided. At diametrically opposite positions on the edge of the body 8, there are provided pocketed elements, generally indicated at 22, which pivotally receive the ends of the bail. Each pocketed element has a bottom wall 23 slotted, as at 24, and forming, in effect, converging shoulders. The under surfaces of these shoulders are tapered, as at 25. The pocketed element also has outstanding, opposed side walls 26, an outstanding inner wall 27, and converging outer wall portions or flanges 28 having an outwardly opening slot 29 therebetween forming an extension of slot 24. In the normal assembly, the flat under surfaces of shoulders 21 at each end of the bail rest against the bottom wall portions 23 of the pocketed element and the legs of the bail depend through slots 24 in the pocketed elements.

Figure 3:
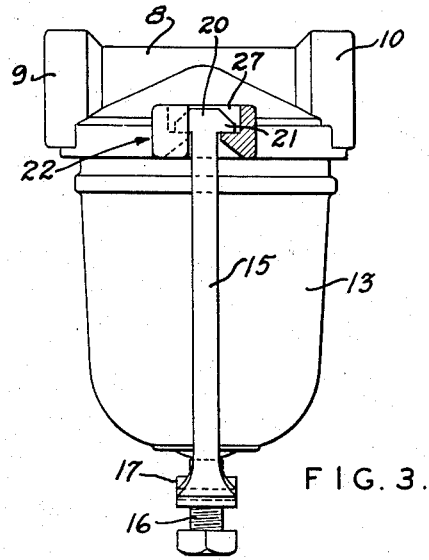
Fig. 3 is a side view of the filter, a part being broken away and sectioned for clearer illustration.
Figure 4:
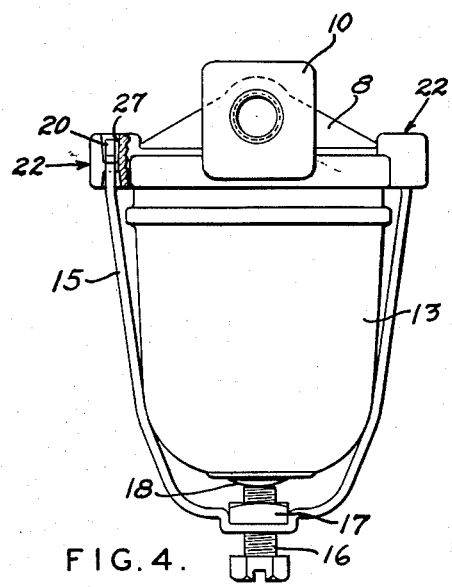
Fig. 4 is a side view of the filter taken at 90° to Fig. 3, a part of the bail support being broken away and sectioned.

In assembling the bail, bowl 13 is removed and the extremities of the bail are bent slightly apart, to permit their reception about pocketed elements 22. The bail legs are then forced together and guided into the pocketed elements, by sliding the bail in its general plane with the bail shoulders seated, as shown in Fig. 3 and in solid lines in Fig. 5. The bail may be tilted, then, for reception of the filter element and glass bowl in their proper positions, the bail returned to its normal securing position, and screw 16 tightened to secure the assembly.

Figure 5:
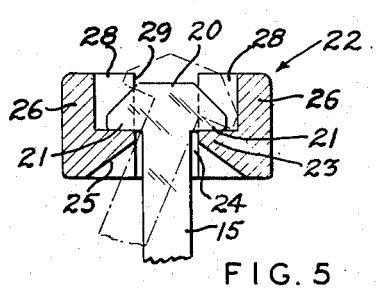
Fig. 5 is a detail, vertical section taken on line 5—5 of Fig. 1.

To disassemble the parts, screw 16 is first loosened, whereupon the bail is rocked or tilted, as indicated in broken lines in Fig. 5, to release the glass bowl which may be removed with the filter. When so tilted, each cross head 20 at the end of the bail leg rides upwardly about one of its corners, as indicated in broken lines in Fig. 5, and disassembly of the bail from the body is then prevented because of the interference of pocket forming walls 26, 27, and 28 and bottom portion 23 of the pocketed element. When the bail is released, it will drop by its own weight to the stable, pendant position. In case it is desired to remove the bail, it is merely necessary to slide the bail upwardly, when in this pendant position, then bend the legs slightly outwardly to withdraw the bail legs through slots 29.

The exact shaping, as shown, of the cross head portions of the bail and of the pocketed elements, is not essential, nor are the details of the filter body and bowl which, in this case, are secured together by the bail. The invention may be modified in these and other respects as will occur to those skilled in the art and the exclusive use of all modifications as come within the scope of the appended claim is contemplated.

I claim:

A body member having fluid connections, a fluid trapping bowl mounted vertically against said body, and a U-shaped bail detachably securing said bowl to said body, said bail having legs and cross heads at the ends of its legs extending normal to the general plane thereof to form spaced shoulders and said body having opposite bail mountings, each of said mountings being formed with upwardly facing pockets, each defined by a bottom, end walls, and inner and outer side walls, the outer side walls and the bottom of each pocket being formed with a slot of less width than the cross heads and of slightly greater width than the width of the bail legs to permit insertion of the bail legs and to define spaced supporting areas on the bottom of the pocket for the spaced shoulders of said cross heads, each of said cross heads having its upper edge defined by converging end areas, said bail being mounted in the pockets to swing transversely to the plane of the legs thereof, said slots in the bottom wall of the pocket in the path of movement of the legs, flaring downwardly and outwardly transversely to the plane of the legs, the inner edges of the outwardly flaring walls of the slot terminating adjacent the bottom of the pocket, whereby the legs of the bail are free to rock in their mountings.

References Cited in the file of this patent

UNITED STATES PATENTS

| | | |
|---|---|---|
| 238,883 | Friedman | Mar. 15, 1881 |
| 526,785 | Lewis | Oct. 2, 1894 |
| 863,160 | De Wein | Aug. 13, 1907 |
| 1,971,353 | Samiran | Aug. 28, 1934 |
| 2,488,921 | Mathews | Nov. 22, 1949 |